United States Patent Office 3,076,009
Patented Jan. 29, 1963

3,076,009
THIOPHOSPHORIC ACID ESTERS AND PRODUCTION
Gerhard Schrader, Opladen, and August Dörken, Wuppertal-Sonnborn, Germany, assignors to Farbenfabriken Bayer Aktiengesellschaft, Leverkusen, Germany, a corporation of Germany
No Drawing. Filed Feb. 8, 1956, Ser. No. 564,108
Claims priority, application Germany Feb. 10, 1955
5 Claims. (Cl. 260—461)

This invention relates to thiophosphoric acid esters of the general formula

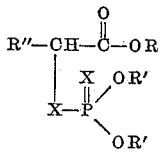

R and R' stand for aliphatic or aromatic radicals, R" stands for hydrogen, aliphatic or aromatic radicals, X stands for oxygen or sulfur whereby one X must be sulfur.

An object of this invention is to provide new thiophosphoric acid esters having good insecticidal properties.

Another object of this invention is to provide processes for making these new thiophosphoric acid esters.

Further objects will become apparent as the following description proceeds.

The thiophosphoric acid esters according to the invencorrespond to the formula

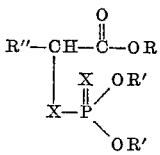

wherein R, R', R" and X have the abovesaid meaning. For instance, R and R' may be methyl, ethyl, propyl, butyl, hexyl, phenyl, nitrophenyl chlorophenyl, tolyl, benzyl etc.; R" may stand for the same radicals or may be hydrogen.

The new thiophosphoric acid esters wherein the chalcogenic X attached to CH and P is oxygen, can be regarded as phosphoric acid derivatives of α-hydroxy carboxylic acid esters. These esters can be prepared by reaction of α-hydroxy carboxylic acid esters with O,O-dialkyl-thionophosphoric acid monohalides in the presence of acid binding agents such as tertiary amines, alkali alcoholates, alkali hydroxides and alkali carbonates.

The reaction leading to this class of compounds may be represented by the following equation:

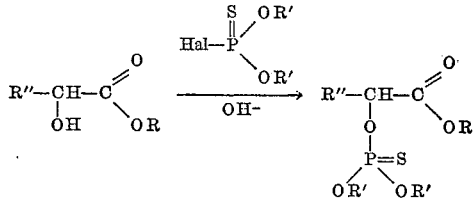

in which R, R' and R" have the meaning set forth in column 1.

The reaction is preferably carried out in suitable solvents such as lower aliphatic alcohols, lower aliphatic ketones, lower aliphatic nitriles, hydrocarbons such as benzene and toluene. It is advantageous to conduct the reaction at a temperature of between 40 and 80° C. but lower or higher temperatures may also be applied.

The new thio- or dithiophosphoric acid esters, wherein the chalcogenic X attached to CH and P is sulfur, may be prepared by reaction of α-halogen-carboxylic acid esters with the salts of dialkyl-thiol or dialkyl-thiol-thionophosphoric acid esters. This reaction is preferably carried out at temperatures of between 40 and 100° C. but lower or higher temperatures may also be applied. It is expedient to work in a suitable solvent such as benzene or toluene. However, ketones such as for example acetone or methyl-ethyl ketone are also suitable for carrying out the reaction. It is further possible to use an excess of the corresponding α-halogen-carboxylic acid ester as solvent.

The reaction leading to this class of compounds may be represented by the equation:

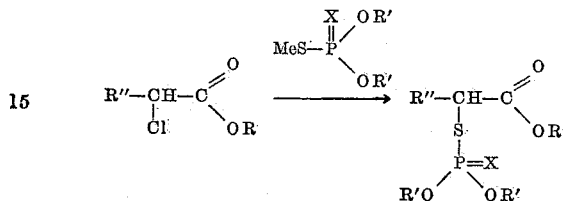

in which R, R', R" and X have the meaning set forth in column 1.

The invention is further illustrated by the following examples without being restricted thereto.

Example 1

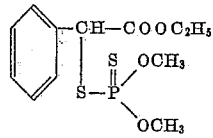

80 grams of the ammonium salt of dimethyl-thiol-phosphoric acid are suspended in 200 grams of α-bromo-phenylacetic acid ethyl ester. The mixture is heated to 60° C. and maintained at 60–70° C. for a half hour. The reaction is completed with slight heat evolution. The mixture is cooled to room temperature, diluted with 500 millilitres of ether, the salts are filtered off by suction and the ethereal layer is washed twice with 100 millilitre portions of water. After drying over sodium sulphate the ether is distilled off. At a pressure of 0.01 mm. Hg there are obtained 100 grams of first runnings which come over at 50–60° C., chiefly consisting of unchanged α-bromophenyl-acetic acid ethyl-ester. By further distillation there are obtained about 100 grams of the new ester coming over at 122–125° C./0.01 mm. Hg as a colourless sparingly water-soluble oil.

Example 2

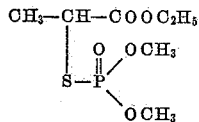

160 grams of the ammonium salt of dimethyl-thiolphosphoric acid are suspended with 320 grams of α-bromopropionic acid ethyl ester. The mixture is heated with stirring to about 60° C. and maintained at this temperature for an hour. It is then cooled down, 600 millilitres of ether are added thereto, the salts thus formed are filtered off by suction and the ethereal solution is washed three times with 100 millilitre portions of water. The ethereal solution is dried and then fractionated. 100 grams of the new ester, B.P. 76–78° C./0.01 mm. Hg, are thus obtained. The excess α-bromo-propionic acid ethyl ester used is recovered as first runnings.

Example 3

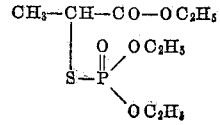

38 grams of diethyl-thiol-phosphoric acid ammonium salt are dissolved in 125 millilitres of 99 percent ethyl alcohol. 38 grams of α-bromo-propionic acid ethyl-ester are added with stirring at 75° C. and the temperature is maintained for an hour. The salts are then filtered off by suction, the filtrate is diluted with water, the water-insoluble residue is taken up with chloroform, dried over sodium sulphate and distilled. 40 grams of the new ester, B.P. 78–79° C./0.01 mm. Hg, are thus obtained.

*Example 4*

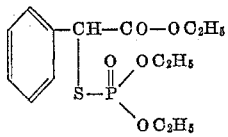

46 grams of diethyl-thiol-phosphoric acid ammonium salt are suspended in 100 millilitres of methyl-ethyl-ketone. 61 grams of α-bromo-phenyl-acetic acid ethyl ester are added with stirring at 60° C., and the mixture is heated to 60–65° C. for an hour. The salts are then filtered off by suction, the bulk of the solvent is distilled off, the product taken up with ether, washed with water and the ethereal solution is dried. By fractionating there are obtained 50 grams of the new ester, B.P. 127° C./0.01 mm. Hg. The new ester is a colourless oil which is able to kill plant lice at a concentration of 0.005 percent and red spiders at 0.01 percent concentration.

*Example 5*

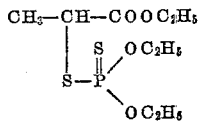

83 grams of powdered and screened potassium carbonate are suspended in 150 millilitres of methyl-ethyl-ketone. 98 grams of diethyl-dithio-phosphoric acid are slowly added with stirring at 40° C. 90 grams of α-bromo-propionic acid ethyl ester are then added drop by drop at 65° C. and the temperature is maintained at 60° C. for four hours. By usual working up, 110 grams of the new ester, B.P. 134° C./2 mm. Hg, are obtained.

*Example 6*

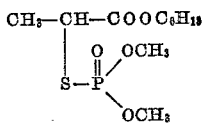

40 grams of dimethyl-thiol-phosphoric acid ammonium salt are suspended in 100 millilitres of methyl-ethyl-ketone. 47 grams of α-bromo-propionic acid-n-hexyl ester (B.P. 65–67° C./1 mm. Hg) are added thereto with stirring at 65° C. The temperature is maintained for about an hour and the product then worked up in usual manner. 35 grams of the new ester, B.P. 98–100° C./0.01 mm. Hg, are thus obtained. The new ester shows with rats per os a toxicity of LD 50=500 mg./kg. It kills plant-lice at a concentration of 0.05 percent.

*Example 7*

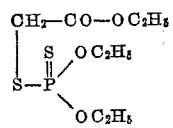

50 grams of diethyl-dithio-phosphoric acid ammonium salt are dissolved in 150 millilitres of methyl-ethyl-ketone. 25 grams of mono-chlor-acetic acid ethyl ester are added with stirring thereto at 70° C. The temperature is maintained at 65° C. for two hours and the product is then worked up in usual manner. 33 grams of the new ester, B.P. 137° C./1.5 mm. Hg, are thus obtained.

*Example 8*

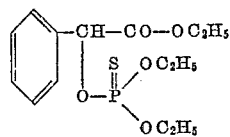

54 grams of mandelic acid ethyl ester are dissolved in 25 grams of pyridine. 57 grams of diethyl-thiono-phosphoric acid monochloride are added thereto with stirring at 40° C. and the mixture is heated to 60° C. for 2 hours. The viscous reaction mixture is introduced into a mixture of 300 millilitres of water and 30 millilitres of concentrated hydrochloric acid. The water-insoluble part is taken up in chloroform and the chloroform solution is shaken with 100 millilitres of a 5% sodium bicarbonate solution. After drying with sodium sulphate the solvent is distilled off. 70 grams of the new ester are obtained as viscous water-insoluble oil. The new ester can be distilled in high vacuum only with decomposition. The new ester kills red spiders at 0.01% concentration.

*Example 9*

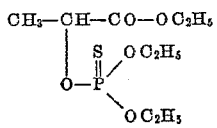

24 grams of lactic acid ethyl ester are added to a sodium ethylate solution (4.6 g. of sodium in 200 millilitres of alcohol) at 20° C. 39 grams of diethyl-thionophosphoric acid monochloride are added drop by drop to the solution at 40° C. and the temperature is kept at 40° C. for 30 minutes. The reaction product is placed in a large quantity of water, the water-insoluble portion taken up in chloroform, dried and fractionated. 35 grams of the new ester, B.P. 69° C./0.01 mm. Hg, are obtained. The new ester has a toxicity of about 1000 mg./kg. when applied to rats per os. The ester kills red spiders at 0.05% concentration.

We claim:
1. A thiophosphoric acid ester of the formula

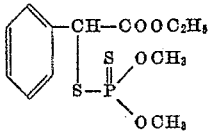

2. A thiophosphoric acid ester of the formula

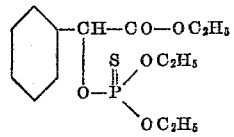

3. A compound of the formula

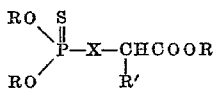

wherein each R is lower alkyl, R' is phenyl and X is a member selected from the group consisting of oxygen and sulfur.

4. A compound of claim 3 wherein X is oxygen.
5. A compound of claim 3 wherein X is sulfur.

References Cited in the file of this patent
UNITED STATES PATENTS 2,266,514    Romieux et al.    Dec. 16, 1941
2,494,126    Hoegberg    Jan. 10, 1950

(Other references on following page)

UNITED STATES PATENTS

| | | |
|---|---|---|
| 2,494,283 | Cassaday et al. | Jan. 10, 1950 |
| 2,645,657 | Rudel et al. | July 14, 1953 |
| 2,802,856 | Norman et al. | Aug. 13, 1957 |

OTHER REFERENCES

Whitemore: "Organic Chemistry," D. Van Nostrand Co., Inc., N.Y. (1937), pp. 37–39.

Melnikov et al.: "Doklady Akad. Nauk S.S.S.R." 86, 543–6 (1952).

Melnikov et al.: "J. Gen. Chem. U.S.S.R.," 23, 1417–1420(a) (1953).

Bacon et al.: "J. Am. Chem. Soc.," 76, 670–676 (1954).

Kosolapoff: "Chemical Abstracts," vol. 48, pp. 6639–6640, 9902–3 (1954).

Mastryukova et al.: "Bull. Acad. Sci. U.S.S.R., Div. Chem. Sci.," p. 433 (1956).

Germany, application Ser. No. F 13502, IV b/12–o. Printed Jan. 26, 1956.